J. BOVEE.
Farm Gate.
No. 236,872.                    Patented Jan. 25, 1881.
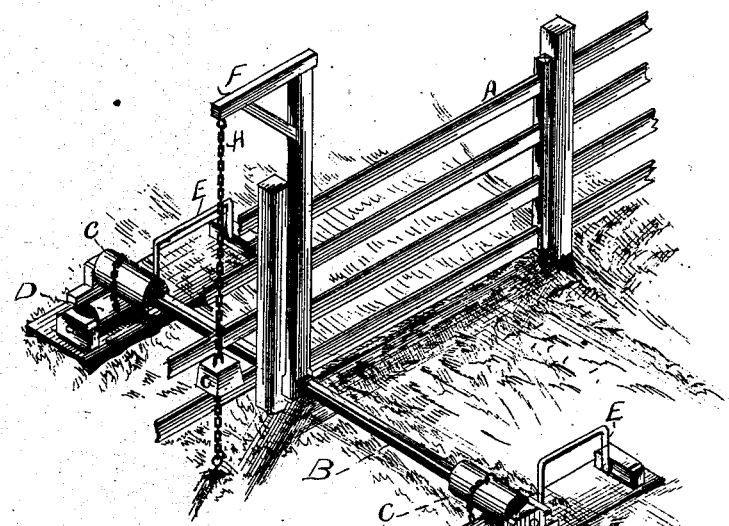
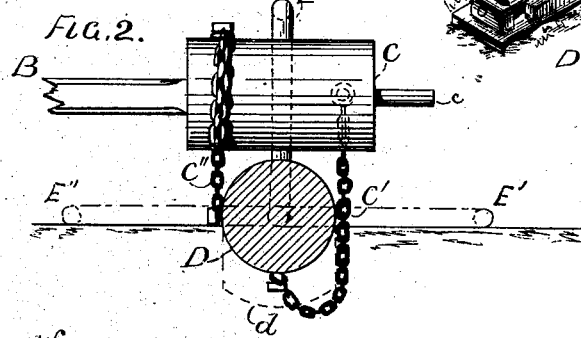
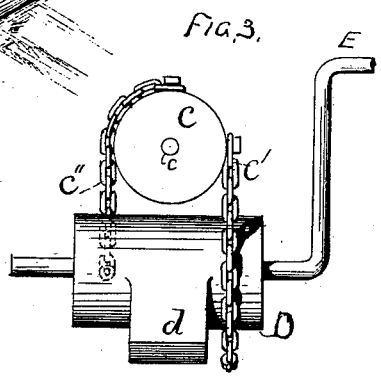

UNITED STATES PATENT OFFICE.

JOHN BOVEE, OF WILMINGTON TOWNSHIP, WILL COUNTY, ILLINOIS.

FARM-GATE.

SPECIFICATION forming part of Letters Patent No. 236,872, dated January 25, 1881.

Application filed December 19, 1879.

*To all whom it may concern:*

Be it known that I, JOHN BOVEE, of the township of Wilmington, in the county of Will and State of Illinois, have invented a new and useful Improvement in Automatic Farm-Gates, of which the following is a specification.

My invention relates to certain improvements in that class of automatic gates which, in the act of opening and closing, swing in a vertical plane by being fastened at one of their lower corners to a shaft at right angles thereto, which, as I am well aware, have been before used, and I make no claim of novelty therefor, my invention consisting of certain mechanism for opening and closing the same, as hereinafter described.

In the accompanying drawings, Figure 1 represents an ordinary farm-gate having my invention applied thereto. Fig. 2 represents a detached view of the same. Fig. 3 shows a side view of crank and cylinder in connection therewith, and an end view of cylinder attached to the horizontal shaft to which gate is attached.

The mechanism of said gate consists of a single crank, formed in a shaft parallel to said gate, and at right angles to and beneath the shaft upon which said gate swings, standing, when at rest, in a vertical position, with which the wheel, coming from either direction, forces it from a vertical to a horizontal position, producing a rotary movement of its shaft, said rotary movement being transmitted to the shaft upon which the gate swings, through the medium of cylinders upon each shaft, so placed as to be one above the other at a point where a vertical plane passing through the axes of said shafts would intersect, connection between said cylinders being made by chains arranged in the manner hereinafter described.

My invention consists in so arranging said chains as to allow both cranks to stand in a vertical position, whether the gate is open or closed, in readiness to be acted upon by vehicle going in either direction, to open or close the same, said chains being sufficiently slack to allow the crank a movement of ninety degrees—that is, from a vertical to a horizontal position independent of gate, in readiness to be acted upon in a reverse direction—that is, if the gate be open to close the same by vehicle acting upon it after having passed through, and if closed to open by vehicle approaching in the act of passing through, said movement of crank independent of gate being caused by a pendulous counter-weight upon the side of cylinder opposite the crank.

Referring to the drawings, $a$ is the gate; B, the rocker-shaft, perpendicular thereto; $c$ $c$, the cylinders upon the end of said shaft; D D, the lower cylinders in a plane at right angles; E E, the cranks in the continuation of their shafts. G is a counter-weight suspended by chain H from gallows-frame F, for the purpose of balancing said gate, facilitating its opening, said chain H to be continued below said counter-weight and attached to the ground, thus preventing said counter-weight from swinging about.

Fig. 2 shows the arrangement of chains forming connection between the cylinders and in the position occupied when gate is closed, said chains communicating motion between the cylinders $c'$ alternately, in the act of closing the gate, said closing being effected by the movement or depression of the crank from vertical position E to the horizontal position, (shown by the dotted lines E' and C'',) in the act of opening the gate, said opening being effected by the movement or depression of the crank from the vertical position E to the horizontal position shown by the dotted lines E''.

In connection with the foregoing it is obvious that the arrangement of the chains is such as to allow cylinder D and crank $a$ movement of ninety degrees independent of cylinder C, thus allowing the crank to move from a horizontal to a vertical position by means of the counter-weight upon said cylinder D, as indicated by dotted lines $d$, in readiness to be again reversely acted upon by vehicle, as described above.

It will be seen from the foregoing that the cranks are always in position to be acted upon by vehicle to open the gate in approaching it, and to close the same after having passed through in either direction.

Having thus described my invention, what I claim is—

The combination of the shaft B, two cylinders, C D, the crank E, the two chains C' C'', connected to the cylinders in such a manner as to allow the cranks to return from a horizontal to a vertical position after having been depressed by wheel of vehicle in the act of either opening or closing the gate, thus leaving it in readiness to be acted upon in a reverse direction, substantially as shown and described.

JOHN BOVEE. [L. S.]

In presence of—
GEO. J. MONROE,
B. H. CASE.